United States Patent
Lee et al.

(10) Patent No.: US 10,740,113 B1
(45) Date of Patent: Aug. 11, 2020

(54) DETERMINING AND PROVIDING CORRELATIONS BETWEEN SEMANTIC CONSTRUCTS IN A REPRESENTATION OF FUNCTIONALITY AND SEMANTIC CONSTRUCTS IN ANOTHER REPRESENTATION OF FUNCTIONALITY

(71) Applicant: The MathWorks, Inc., Natick, MA (US)

(72) Inventors: Ji W. Lee, Natick, MA (US); Irwin H. Kwan, Hudson, MA (US); Takshak Desai, San Francisco, CA (US); Frederick Mattsson Smith, Natick, MA (US); Alexander J. von Alt, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/007,605

(22) Filed: Jun. 13, 2018

Related U.S. Application Data

(60) Provisional application No. 62/679,281, filed on Jun. 1, 2018.

(51) Int. Cl.
*G06F 8/33* (2018.01)
*G06F 8/34* (2018.01)
*G06F 9/448* (2018.01)
*G06F 8/41* (2018.01)

(52) U.S. Cl.
CPC ............. *G06F 9/448* (2018.02); *G06F 8/33* (2013.01); *G06F 8/34* (2013.01); *G06F 8/436* (2013.01)

(58) Field of Classification Search
CPC . G06F 9/448; G06F 8/33; G06F 8/436; G06F 8/34
USPC .......................................................... 717/113
See application file for complete search history.

(56) References Cited

U.S. PATENT DOCUMENTS

| | | | | |
|---|---|---|---|---|
| 2002/0063734 | A1* | 5/2002 | Khalfay | G06F 8/30 715/744 |
| 2006/0088144 | A1* | 4/2006 | Mitchell | G06Q 10/10 379/88.17 |
| 2009/0319543 | A1* | 12/2009 | Danton | G06F 16/26 |
| 2017/0255694 | A1* | 9/2017 | Byron | G06F 16/3344 |

\* cited by examiner

*Primary Examiner* — John Q Chavis

(57) ABSTRACT

A user interface may display visual traces between semantic constructs in representations of functionality. The representations of functionality may include textual programming language code, graphical programming language code, graphical or textual models, and/or text. The visual trace enables a party to visually review the correlations between the semantic constructs. The visual trace may include unique visual cues for distinguishing a degree of nesting of programming language constructs. For example, each successive level of nesting of a programming language construct may be associated with a different shade of a color. The user interface may be interactive and provide real-time feedback based upon actions of a party. The system determines what semantic constructs are to be visually distinguished on the user interface based on the location of an action and based on the hierarchy of semantic constructs and correlations.

22 Claims, 18 Drawing Sheets

(Part 1)

```
distance_between_cities. m
12  % type is either "gc" or "eq", which calculates either great
13  % distance or equirectangular projection distance.
14  %
15  % Output:
16  % distance_guide is a N+1xN+1 matrix that corresponds t
17  % cities in the cities matrix containing the distance (km)
18  % cities labelled rows and columns.
19
20  N - 1;
21  distance_guide - cell(length(cities) +1);
22  distance_guide{1, 1} = ' ' ;
23
24  %% calculate the distances
25  for i - 1: length(cities)
26      for j - N: length(cities)
27
28          if i == 1 && j >1
29              distance_guide{i, j} -   cities(j - 1). city;
30              distance_guide{j, 1}  cities(j - 1). city;
31          end
32
33          p1 + cities(i).location;
34          p2 -  cities(j).location;
35
36          if strcmp(type, "gc" )
37              distance_guide{i + 1,j + 1} = great_circle_distanc
38              distance_guide{j + 1,i + 1} = great_circle_distance
39          else
40              distance_guide{i + 1, j + 1} = equirectangular_ pu
41              distance_guide{j + 1, i + 1} = equirectangular_ pu
42
43          end
44          N = N + 1;
45  end
46
47  distance_guide{length(cities) + 1, 1} = cities(end).city;
48  distance_guide{1, length(cities) + 1} = cities(end).city;
49
50  end
```

*Fig. 5*

(Part 2)

```
247    loop_ub - cities[3].city.size[1] * cities[3].city.size[0]
248    for (10 - o; i0 < loop_ub; i0 ) {
249       distance_guide->f5.data[i0] = cities[3].city.data[i0];
250    }
251
252    if (b_strcmp(type)) {
253       distance_guide->f32 - great_circle_distance(cities[0] . . .
254          location);
255       distance_guide->f12 - great_circle_distance(cities[0] . . .
256          location);
257       distance_guide->f15 - great_circle_distance(cities[1] . . .
258          location);
259       distance_guide->f21 - great_circle_distance(cities[1] . . .
260          location);
261       distance_guide->f16 - great_circle_distance(cities[1] . . .
262          location);
263       distance_guide->f27 - great_circle_distance(cities[1] . . .
264          location);
265       distance_guide->f17 - great_circle_distance(cities[1] . . .
266          location);
267       distance_guide->f33 - great_circle_distance(cities[1] . . .
268          location);
269       distance_guide->f18 - great_circle_distance(cities[1] . . .
270          location);
271       distance_guide->f22 - great_circle_distance(cities[2] . . .
272          location);
273       distance_guide->f28 - great_circle_distance(cities[2] . . .
274          location);
275       distance_guide->f23 - great_circle_distance(cities[2] . . .
276          location);
277       distance_guide->f34 - great_circle_distance(cities[2] . . .
278          location);
279       distance_guide->f24 - great_circle_distance(cities[2] . . .
280          location);
281       distance_guide->f29 - great_circle_distance(cities[3] . . .
282          location);
283       distance_guide->f35 - great_circle_distance(cities[3] . . .
284          location);
285       distance_guide->f30 - great_circle_distance(cities[3] . . .
286
```

Fig. 5
(Part 3)

| SUMMARY | ALL MESSAGES (0) | BUILD LOGS | CODE INSIGHTS (5) | VARIABLES |
|---|---|---|---|---|
| Name | Type | Size | Class | |
| N | Local | 1x1 | double | |
| ▶ cities | Input | 1x5 | struct | |
| ▶ distance_guide | Output | 6x6 | cell | |
| i | Local | 1x1 | double | |
| j | Local | 1x1 | double | |
| p1 | Local | 1x2 | double | |

*Fig. 5*
(Part 4)

Fig. 8A

```
24  coordinates(j,:)=cities(city_id).location;
25  if [j == 1] && (geocoordinates_in_range(coordinates(j+1,:)))
26      distance = distance . . .
27          great_circle_distance(coordinates(j,:), coordina
28  elseif j = 2
29      distance = distance . . .
30          great_circle_distance(coordinates(j,:), coordina
31  end
32      j = j + 1;
33      if j > 2; j = 1; end;
34  end
35      i = i + 1;
36  end
37
38  end
39
```

```
81  [j == 1] && ((coordinates[2] >= -90.0) && (coordi
82         90.0) && ((coordinates[3] >= -180.0) && (coordi
83         180.0)))) {
84  /* GEOCOORDINATES_IN_RANGE Check the bou
85  /* 1 (true) if the coordinate is in numerical bound
86  /* latitude: -90 to 90. */
87  distance ++ great_circle_distance(*(diuble ( )[2])&
88      (double ( )[2]) coordinates[2]);
89  } else {
90  if (j = 2) {
91  distance += great_circle_distance(*(double (*)[2]
92      (double (*)[2])&coordinates[0]);
93      }
94      }
95
96
```

Fig. 8B

```
24  coordinates(j,:)=cities(city_id).location;
25      if j == 1 && (geocoordinates_in_range(coordinates(j+1,:)))
26          [distance = distance ...
27          great_circle_distance(coordinates(j,:), coordina
28      elseif j = 2
29          distance = distance ...
30          great_circle_distance(coordinates(j,:), coordina
31      end
32      j = j + 1;
33      if j > 2; j = 1; end;
34  end
35      i = i + 1;
36  end
37
38  end
39
```

```
81  ((j == 1) && ((coordinates[2] >= -90.0) && (coordi
82                 && ((coordinates[3] >= -180.0) && (coordi
83                 90.0)
84                 180.0))) {
85  /* GEOCOORDINATES_IN_RANGE Check the bou
86  /* 1 (true) if the coordinate is in numerical bound
87  /* latitude: -90 to 90. */
88  distance ++ great_circle_distance(*(diuble ( )[2])&
89                 (double ( )[2]) coordinates[2]);
90  } else {
91  if (j = 2) {
92  distance += great_circle_distance(*(double (*)[2]
93                 (double (*)[2])&coordinates[0]);
94      }
95  }
96
```

DETERMINING AND PROVIDING CORRELATIONS BETWEEN SEMANTIC CONSTRUCTS IN A REPRESENTATION OF FUNCTIONALITY AND SEMANTIC CONSTRUCTS IN ANOTHER REPRESENTATION OF FUNCTIONALITY

RELATED APPLICATIONS

This application claims priority to U.S. Provisional Application No. 62/679,281, filed Jun. 1, 2018. The contents of the aforementioned application is incorporated herein by reference.

SUMMARY OF THE INVENTION

In accordance with an exemplary embodiment of the present invention, a method is performed by a computing device. In this method, at least a portion of a first representation of functionality is displayed on a user interface. An indication of an action at a location on the user interface is received. The location of the action is determined as being over one or more characters in the first representation of functionality. Based on the determined location, a hierarchical scope of semantic constructs that provide semantic completeness is identified. A second representation of functionality is displayed on the user interface. At least one semantic construct in the second representation of functionality is determined as being correlated to the semantic constructs of the identified hierarchical scope. A visual cue that the at least one semantic construct of the second representation of functionality is correlated to the semantic constructs of the first representation of functionality in the identified hierarchical scope is displayed, wherein the visual cue visually identifies both the semantic constructs of the first representation of functionality in the hierarchical scope and the at least one correlated semantic construct of the second representation of correlated functionality.

Instructions for performing this method may be stored in a non-transitory storage medium. The instructions may be executed by a processor of a computing device that includes a display device and a storage.

The first representation of functionality and the second representation of functionality may each be textual programming code, graphical programming code, textual content, or a model.

The first representation of functionality and the second representation of functionality may be semantically equivalent.

The semantic constructs may include at least one of an expression, a statement, a function, a macro, a level of a syntax tree, a model component, a block, a line of code, a diagram, an icon, a requirement or an object.

The visual cue may provide a visual trace between semantic constructs of the first representation of functionality and the at least one correlated semantic construct of the second representation of functionality.

The identifying of the hierarchical scope of the semantic constructs that provides semantic completeness may include determining what line in the first representation the location is on. The identifying the hierarchical scope may also include identifying tracked elements on the determined line and based on the identified tracked elements, identifying the hierarchical scope of semantic constructs in the first representation.

A filtering criteria may be applied to the first representation of functionality to select what portions of the first representation of functionality and/or what portions of the second representation of functionality are displayed.

The first representation of functionality may be source code as may be the second representation of functionality.

BRIEF DESCRIPTION OF THE DRAWINGS

FIGS. 8A-8D depict the successive appearance of a user interface as a user moves a cursor to different positions on a line in a representation of functionality.

DETAILED DESCRIPTION

Figure 1:
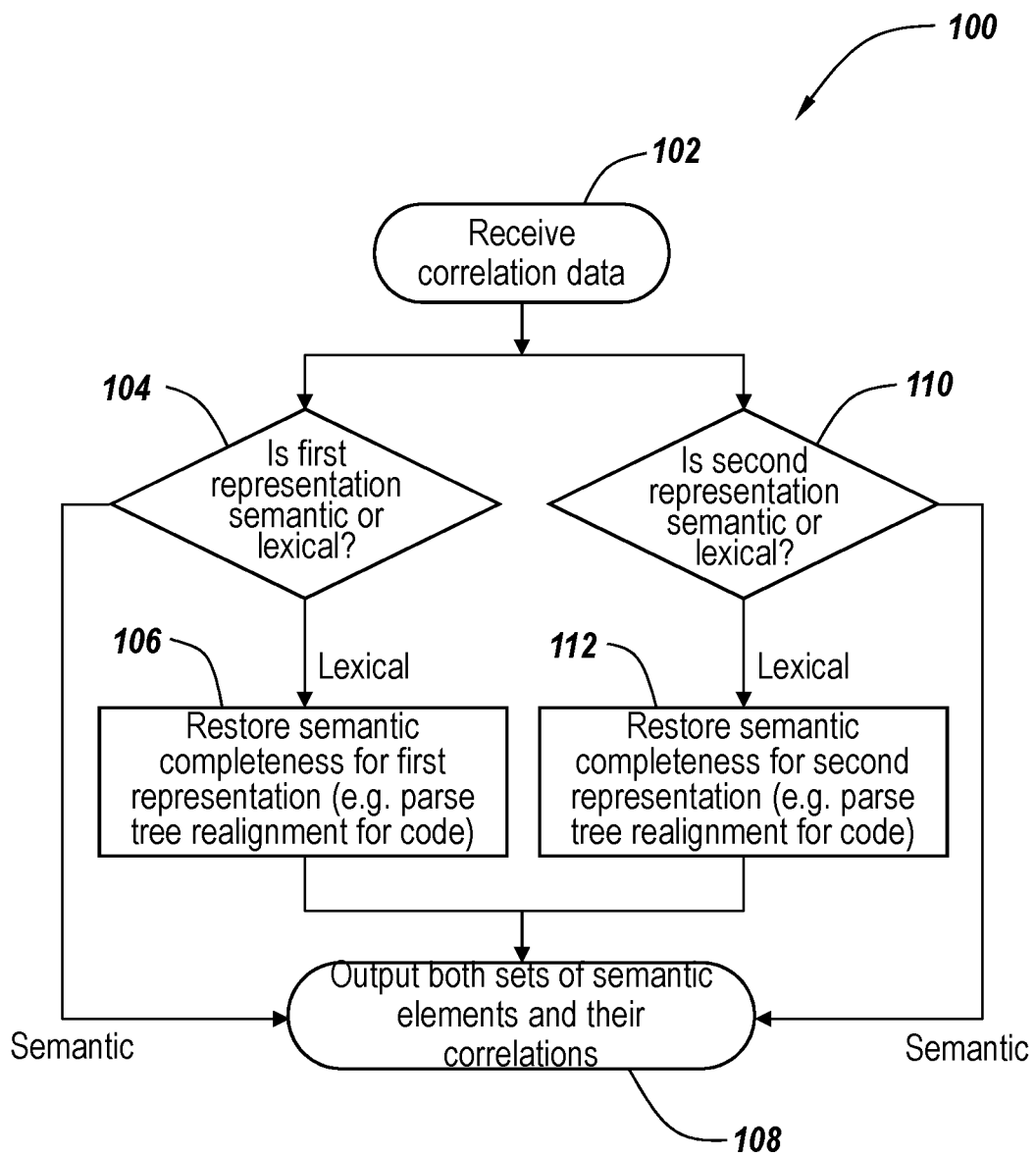
FIG. 1 is a flowchart depicting the steps that are performed to ensure that each of the representations of functionality is semantically complete.

Exemplary embodiments generate and provide correlation information between semantic constructs in different representations of functionality. The correlations specified by the correlation information may take many forms. The correlation information, for example, may identify that the semantic meaning of one semantic construct in a representation of functionality is equivalent to another semantic construct in another representation of functionality. This is a form of semantic equivalence and the correlations may capture the semantic equivalence. The correlation information may instead, for example, indicate a requirement association where requirements are associated with programming language code or model components. The correlation information may alternatively indicate a cause and effect relationship where one representation causes the other representation (e.g., a portion of a model causes certain modeling results). The correlation information may instead specify a location relationship (such as hierarchy and positions in programming language code). Thus, the nature and meaning of the correlations may depend on the representations.

The exemplary embodiments identify and convey "correlations" between semantic units in a first representation into correlatable semantic units in a second representation dissimilar to the first. The concept of "correlation" as used herein may refer to any mapping, relationship, or other form of association that conveys information useful to an end-user given the context in which the embodiment exists.

The representations of functionality can be textual or graphical. The representations of functionality may be, for example, textual programming language code, textual models, requirement specifications, textual content, graphical models, or graphical programming language code. In some implementations, one of the representations of functionality may be a source representation, such as a system requirement specification, a graphical model for a dynamic system, a set of code in a programming language, or the like, while the other representation is a generated representation, such as automatically or manually generated software code. In other instances, comments are generated from programming language code, such as graphical code or textual code. In that case, the code may be part of a first representation and the comments part of a second representation. These representation may provide functionalities, such as, for instance, modeling behavior of systems and features in an automobile or aircraft, control of industrial plants or industrial components, signal processing in consumer electronics, industrial automation, powered machines, etc.

Semantic constructs are the units of information that are deduced and analyzed in the exemplary embodiments herein. The semantic constructs may be defined natively with a programming language or a modeling language. In instances where the representation of functionality includes programming language source code, semantic constructs may refer to things like variables, expressions, lines, statements, loops, functions, objects, etc. In instances where the representation contains graphical programming language code, the semantic constructs may refer to things like icons, blocks, forms, shapes, diagram elements and the like. In instances where the representation includes graphical models, the semantic constructs refer to things like blocks, lines, etc. In instances where the representation includes text or textual models, the semantic constructs may refer to words, lines, sentence, paragraphs, sections, etc.

In some implementation, correlation information can be presented to a user via a user interface. For example, a side by side view of correlated representations of functionality may be shown. Semantic constructs of the first representation and correlated semantic constructs in the second representation may be highlighted to illustrate the correlations between the semantic constructs. For example, the system may visually identify the correlations between a function in the first representation and a correlated function generated in the second representation. Certain visual cues may provide a "visual trace" in the user interface to identify the correlations.

A benefit of depicting semantic constructs specific to individual paradigms (such as individual programming languages, modeling languages, or structural rules or specifications) is that one conveys information to end users via abstractions and granularities native to the originating paradigm. In contrast, for implementations concerning source code, conventional approaches convey the same information utilizing singular generic constructs like tokens, words, or character ranges that have neither inherent specificity to individual paradigms and do not preserve higher-level attributes of such paradigms.

A party, such as a user or programmatic entity, may take an action relative to one of the displayed representations to indicate a desire to see one or more semantic constructs in the representation and to see correlated semantic constructs in the other representation. This serves as a trigger for display of visual traces. The action may take many forms, such as receiving an input, like a mouse position, a mouse button click, a keystroke or the like. Based on the action and in some instances, other information, like cursor position, the exemplary embodiments may identify a character or characters in the displayed listing of the representation. The semantic construct(s) associated with the character(s) is/are identified and visual cues (such as graphical affordances) are displayed on the user interface as a visual trace to show the correlations between the semantic constructs in the representations.

The exemplary embodiments may identify nested semantic constructs in a representation and the correlated semantic constructs in the other representation. For example, suppose that a first representation is a portion of MATLAB (MATLAB is a trademark of The MathWorks, Inc. of Natick, Mass.) code and the second representation is a portion of C code that is generated from the MATLAB code. Further suppose that the MATLAB code has a semantic construct that contains a number of nested semantic constructs. In that case, the nested programming language constructs may be visually distinguishable from the semantic construct in which the nested constructs are nested. A visual cue may be shown to identify that the first semantic construct and the nested semantic constructs are related. For example, the first semantic construct and nested constructs may be highlighted in a same color. The nested semantic constructs may be highlighted, for example, with a different shade of the color. The shade may correspond to the level of nesting such that a second level nested semantic construct that is nested within a first level nested semantic construct may be highlighted with a different shade than the first level nested semantic construct to visually distinguish the semantic constructs. In this fashion, the shade is a visual cue of the level of nesting of the semantic construct. This enables a party to identify the nesting of semantic constructs and the correspondence between the higher level semantic constructs (i.e., constructs in which nested semantic constructs are nested) and the nested semantic constructs. The system is able to handle multiple levels of nesting and to visually distinguish the multiple levels of nesting.

In some instances, the second representation may include content in multiple files. For example, code in a first representation may generate code in a second representation across multiple files.

Correlated semantic constructs in different representations of functionality need not both include nested constructs. A semantic construct in one representation may include no nested semantic constructs but may be correlated with a correlated semantic construct that includes nested semantic constructs as part of the other representation.

The nesting may take different forms depending on the nature of the representations of functionality. For example, if the representation contains object-orientated code, subclasses as well as object code that relates to the subclasses may be nested in classes. Where the representation of functionality is a graphed model, there may be a block of a subsystem type, and such a subsystem may, in turn, contain blocks that form the subsystem (the contained blocks may be viewed as "nested") for example. In the case where the representation is a requirement specification, a sub-requirement may be nested in a higher level requirement. Where a representation is a state chart, the nesting may include, for example, nested semantic constructs in the form of contained states nested in other states. Where the representation is a spreadsheet or rich text document, the nesting may be indicated by indentation or indentifiers (e.g., a numbering scheme).

As mentioned above, a visual trace (such as a highlighted directional path) may be provided that extends between a semantic construct in a representation to the correlated semantic construct(s) in the other representation. Different visual cues may be provided to distinguish between the representations as part of the visual trace. Hence, for example, the portion of the visual trace that relates the second representation to the first representation may be blue, whereas the portion of the visual trace that relates the first representation to the second representation may be orange. The source representation from which a visual trace is triggered may be assigned a first color in a visual trace whereas the destination representation may be assigned a different color in the visual trace.

The nesting may play a role in determining what semantic construct is highlighted or visually distinguished in response to an action by a party. The system may identify a larger semantic construct in which the semantic construct is nested in response to an action by a party at a portion of the nested construct. The larger semantic construct may be highlighted or visually distinguished with a visual cue in response to the action and the identification of the larger semantic construct. Thus, not only is a selected nested semantic construct identified by a visual cue, such as a visual trace, but also the context is identified by the visual cue identifying the larger semantic construct.

Exemplary embodiments may provide a user interface that displays at least a portion of both representations. The user interface may be interactive to allow a user to choose semantic constructs and gain an understanding of the corresponding semantic construct(s) in the other representation. This enables a party to discover the relationships between semantic constructs both within a representation as well as between representations. In addition, the party may navigate the nesting of semantic construct to understand the levels of nesting and to understand how these nested levels correspond to the semantic constructs in the other representation. Moreover, the party may navigate through both representations to select semantic constructs of interest and see the visual traces for those semantic constructs.

The exemplary embodiments may be helpful to debug representations as useful information is displayed by a user interface that helps a user to understand the relationships between semantic constructs in different representations. Moreover, a user can identify semantic constructs in one representation that may be modified to result in better semantic constructs in the other representation.

The exemplary embodiments may provide a user interface that is easy to use and intuitive. The visual traces may readily identify correlations between semantic constructs. The traces may be triggered by actions such as hovering and clicking that are familiar to users.

Filtering of representations and/or semantic constructs may be provided to show only useful information to the user. For example, portions of a representation that comply with a coding standard may be shown whereas non-compliant portions may not be shown. Similarly, only problematic portions of the representation that have error or that do not comply with coding standard may be shown. The filtering may be applied using modeling standards to show semantic constructs and/or portions of the representation that comply with the modeling standards or that fail to comply with the modeling standards. Filtering may also be used with requirements. For instance, only code that satisfies or is related to a requirement may be shown by applying a filter.

The darkening of the coloring relative to semantic constructs in the visual traces may be used to identify the level of nesting of the semantic construct. Thus, for example, suppose that a first semantic construct contains a second semantic construct, which, in turn, contains a third semantic construct. All three semantic constructs may be shown with a visual cue of the same color. However, the first semantic construct may be shown with a lighter shading of the color, and the second semantic construct may be shown with a darker shading of a color. The third semantic construct may be shown with a darkest shading of the color to provide a visual cue of the level of nesting of the third semantic construct.

The visual cues need not rely strictly on shading and may rely on other forms of visual cues. For instance, each level of nesting may be associated with unique color in some embodiments. Moreover, in a gray scale representation, the levels of nesting may be indicated by different gray scale levels. More generally, certain other parameters of color may be used to visually distinguish among nesting levels of semantic constructs. The variants in the parameters depend upon how coloring is encoded and what coloring space is utilized. Another alternative, is to show the semantic constructs in different sizes or to fade the visual depiction to distinguish amongst the nesting levels of the programming language constructs. In general, the aim is to visually distinguish amongst the nesting levels for the programming language constructs. It should be appreciated that other methods may be used to visually distinguish among the nesting levels of the programming language constructs.

As mentioned above, the exemplary embodiments seek to determine and provide correlations between semantic constructs in different representations of functionality. In order to determine and provide correlations between the semantic constructs in the representations, the exemplary embodiments may process the representations to make sure that they are semantically complete and are not mere lexical representations. For example, if a representation contains a mere flat stream of tokens, there is a need to update the representations so as to reflect the underlying semantic hierarchy of the semantic constructs.

FIG. 1 is a flowchart 100 of the steps that are performed to insure that the representations of functionality are semantic representations that are semantically complete. Semantically complete in this context indicates that the representation specifies the hierarchy of semantic constructs in the representation. In step 102, correlation data is received for semantic constructs in the respective representations. The correlation data may be determined during preprocessing of the representations or when a party requests display of one or more visual traces that extends between semantic constructs in the respective representations.

In step 104, a determination is made whether the first representation is a semantic representation or a lexical representation. If the first representation is a lexical representation, steps are taken to restore the semantic completeness for the first representation. For example, as will be described in more detail below, in the case where the first representation contains programming language code, the code may be aligned relative to a parse tree to restore the hierarchy of semantic structure so that the semantic constructs are in place and identifiable. Similar steps are performed for the second representation. In particular, a determination is made whether the second representation is semantic or lexical in step 110. If the representation is lexical, steps are taken to restore the semantic completeness for the representation in step 112. If the representations are already semantic or after the representations have been restored in step 106 or step 112, the sets of semantic constructs and their correlations are output in step 108. Moreover, this output may be stored in a storage for future reference.

The exemplary embodiments may maintain a bipartite graph of correlations between representations. The bipartite graph includes semantic constructs in the respective representations and references among the semantic constructs that identify correlations. Disjoint sets of data are maintained for each representation. Each piece of data in the data sets identifies a semantic construct and any correlated semantic constructs in the other representation.

Figure 2:
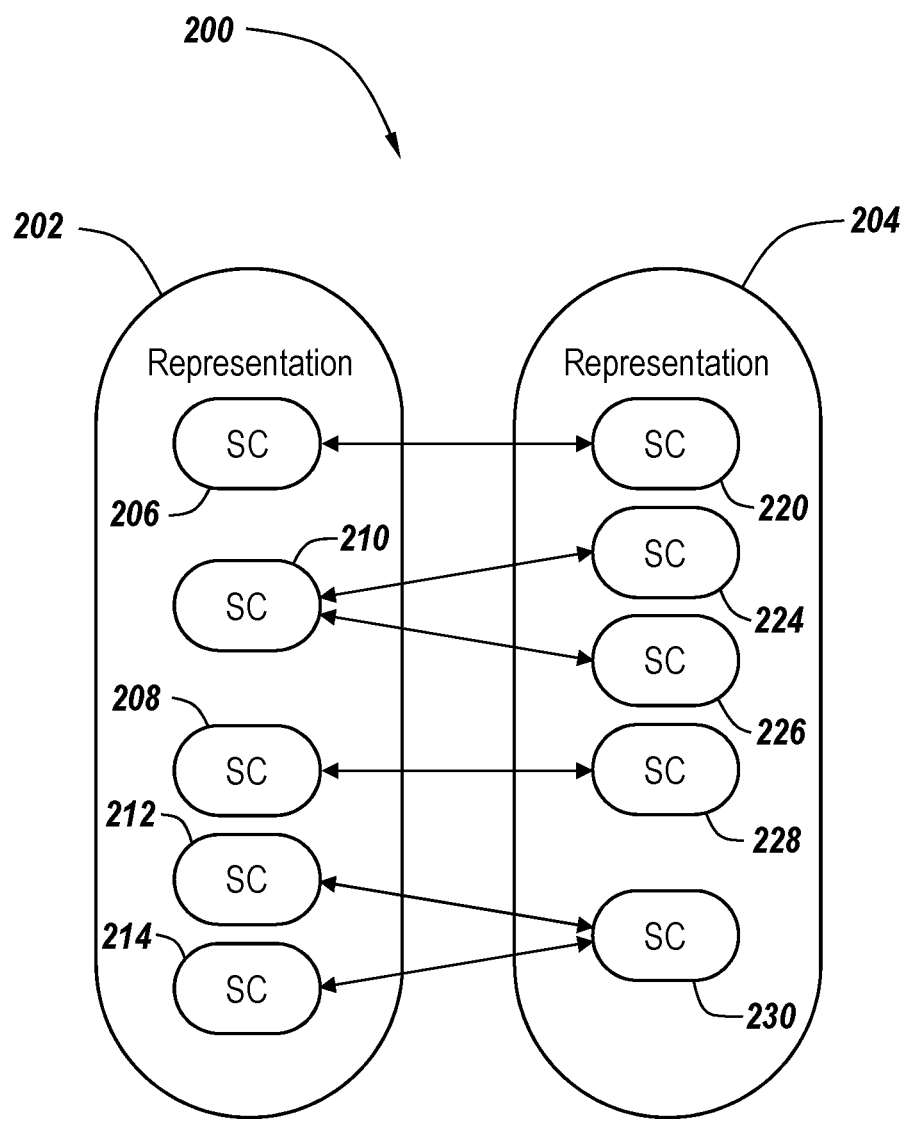
FIG. 2 is a diagram depicting a bipartite graphical representation between semantic constructs of representations of functionality.

FIG. 2 shows an example bipartite graph 200 for two representations 202 and 204. As can be seen in FIG. 2, representation 202 includes semantic constructs 206, 208, 210, 212, and 214, and representation 204 includes semantic constructs 220, 224, 226, 228, and 230. The directed arrows connecting semantic constructs reflect that the semantic constructs are correlated. Thus semantic construct 206 in representation 202 is correlated with semantic construct 220 in representation 204. This is an example of a one-to-one correlation. Semantic construct 208 in representation 202 is correlated with multiple semantic constructs 224 and 226. This is an instance of a one-to-many relationship. Similarly, semantic constructs 212 and 214 in representation 202 are correlated with a single semantic construct 230 in representation 204. This is an example of a many-to-one relationship. The depiction in FIG. 2 shows bidirectional correlations. Nevertheless, it should be appreciated that in some embodiments, the correlations need not be bidirectional.

In one exemplary embodiment, location data is provided in the system for the semantic constructs. The location data constitute the data sets for the representations that create the bipartite graph. An example of fields of interest in a location datum is as follows:

{
"locationId": 64, (ID to be used by other locations in referencing this location)
"file": "VmyVpathVtoVjileeVfilesVexampleVfoo.m", (The text/source file to which the coordinates of this location map)
"start": 171, (Absolute character offset into the full text of the associated file representing the start of the location range)
"end": 189, (Absolute character offset into the full text of the associated file representing the end of the location range)
"traces": (Set of references to locations in the opposing location set comprising the bipartite graph that this location "traces to")
2163, (ID of a single location in the opposing location set)
2171,
2182
]
}

Descriptive comments are specified above in parenthesis after the fields.

As can be seen in this example, the location has a "location ID" field holding a value of 64 that may be referenced by other locations to reference this location. The "file" field identifies a file to which the coordinates of this location map. A path name is given in this example. A "start" field specifies the absolute character offset from the start of the location range, and the "end" field specifies the absolute character offset of the end of the location range. The "traces" field is a set of references to the locations in the opposing location set (i.e., other representation data set). The "traces" field is followed by a number of location IDs of constructs in the opposing location set to which there is a correspondence.

The "traces" references create the connections of the bipartite graph between representations. These references indicate the semantic construct at this location is related to the semantic constructs at the referenced locations in the other representation. The referenced locations will have a trace reference in their location datum back to this location so that there are cross references.

The specified character range between the start and end values may be used to determine whether the associated semantic construct contains other nested semantic constructs or is itself a nested semantic construct. This is paradigm specific and applies to instances such as the example programming language where nested constructs are contained within the range of the higher level semantic construct.

The representations may already contain correlation data that is received in step 102 of FIG. 1. For example, the bipartite graph shown in FIG. 2 may be already encoded in the representations or in a separate data set. In some embodiments, the correlations are determined and subsequently stored. In the instance in which the first representation represents a source representation of programming language code and the second representation represents code that is generated from the source representation, the correlations may be noted and stored during the code generation process. Similarly, where the first representation is a graphical or textual model and the second representation is generated programming language code, the correlations may be noted and stored as part of the code generation process. More generally, where the correlations are not recorded in the representations or in the separate data set, the correlations may be noted by processing the representations and recording the correlations in an appropriate data set or other fashion.

Figure 3:
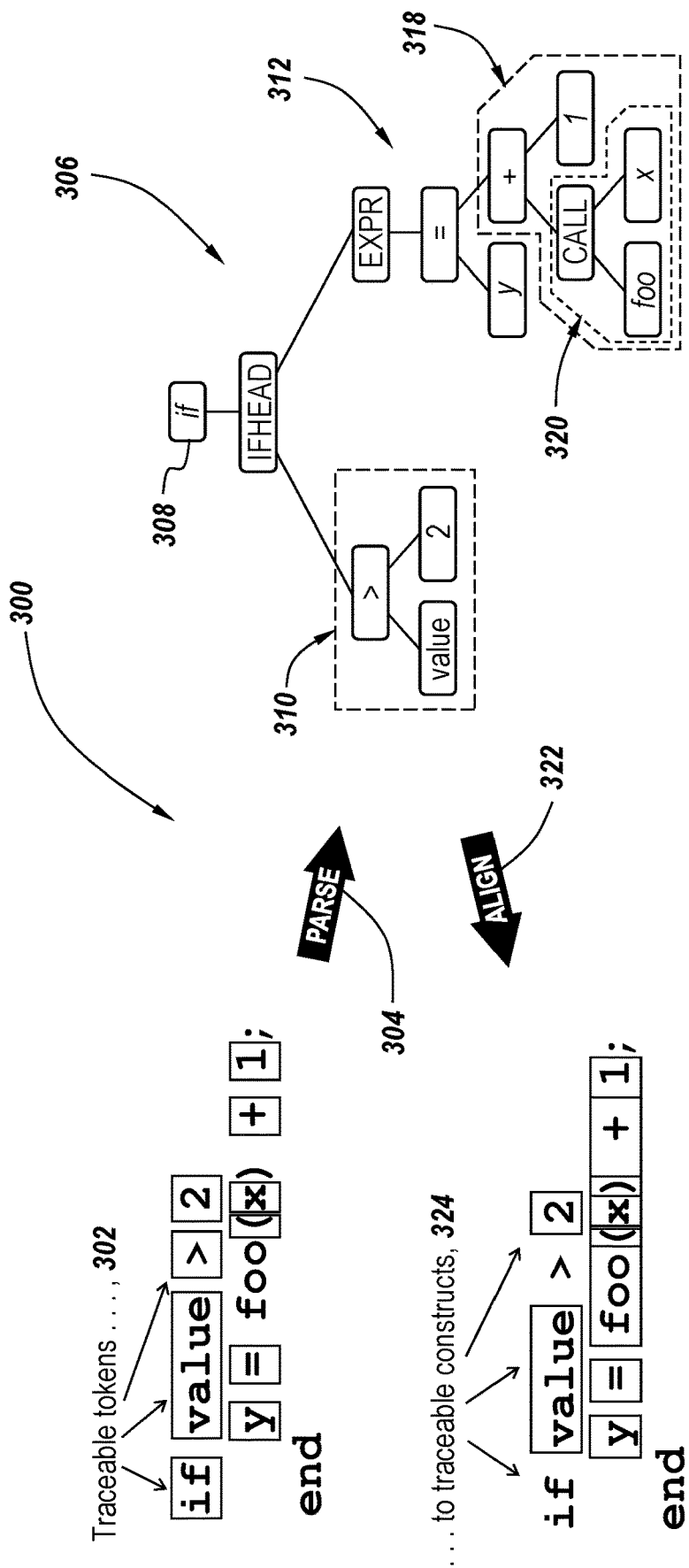
FIG. 3 is a diagram illustrating aligning flat stream of tokens in accordance with the parse tree to develop semantic constructs.

FIG. 3 shows an example in which one of the representations contains programming language code that is not semantically complete and contains a flat stream of tokens 302. As shown in FIG. 3, the process 200 begins with receipt of the tokens 302. The flat stream of traceable tokens 302 may be output, for example, from a code generator. Alternatively, the traceable tokens 302 may originate from a lexical representation that is not generated from a code generator but rather is simply a representation that lacks semantic completeness. In operation 304, the tokens 302 are compared to a parse tree 306. Parse tree 306 includes a root node 308 as well as subtrees 310 and 312. Subtree 312 includes additional subtrees 318 and 320. As was mentioned above, the traceable tokens 302 are compared to nodes in the parse tree 306 to determine where the tokens fit in the hierarchy specified by the parse tree. In this fashion, the semantic constructs 324 may be created by aligning 322 the tokens with the elements of the parse tree. In the example depicted in FIG. 3, the tokens are all part of an if statement and the corresponding semantic constructs may be built and stored, such as discussed above relative to steps 106 and 112.

Figure 4:
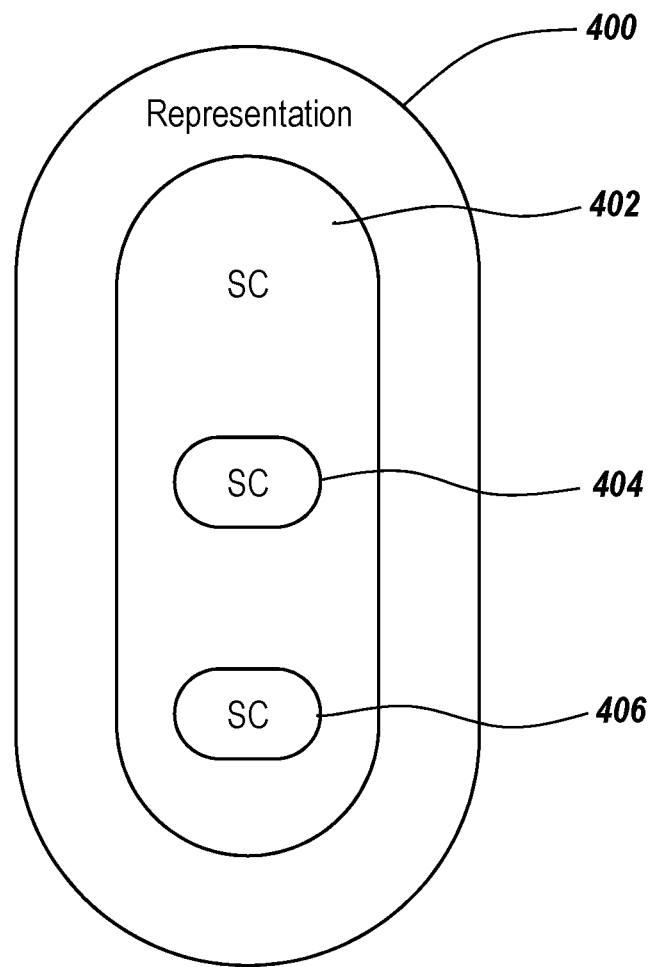
FIG. 4 is a diagram depicting an instance in which semantic constructs are nested within a higher level semantic construct.

As was discussed above, semantic constructs may be nested. FIG. 4 shows an example of a representation 400 that contains a semantic construct 402. Nested within the semantic construct 402 are additional semantic constructs 404 and 406. One example of nested semantic constructs where representation 400 contains programming language code is that semantic construct 402 is an if statement that includes additional if statements 404 and 406. The additional if statements constitute nested semantic constructs 404 and 406 in the depiction of FIG. 4. Similarly, if the representation 400 is a graphical model, semantic construct 402 may constitute a subsystem that includes blocks 404 and 406 that are nested semantic constructs. In a still further example, the representation 400 is a requirements documents that contains a requirement 402 that includes some sub-requirements 404 and 406 that are nested semantic constructs. For example, by a line numbering scheme such as x.y.z, where y is nested in x and z is nested in y.

Figure 5:
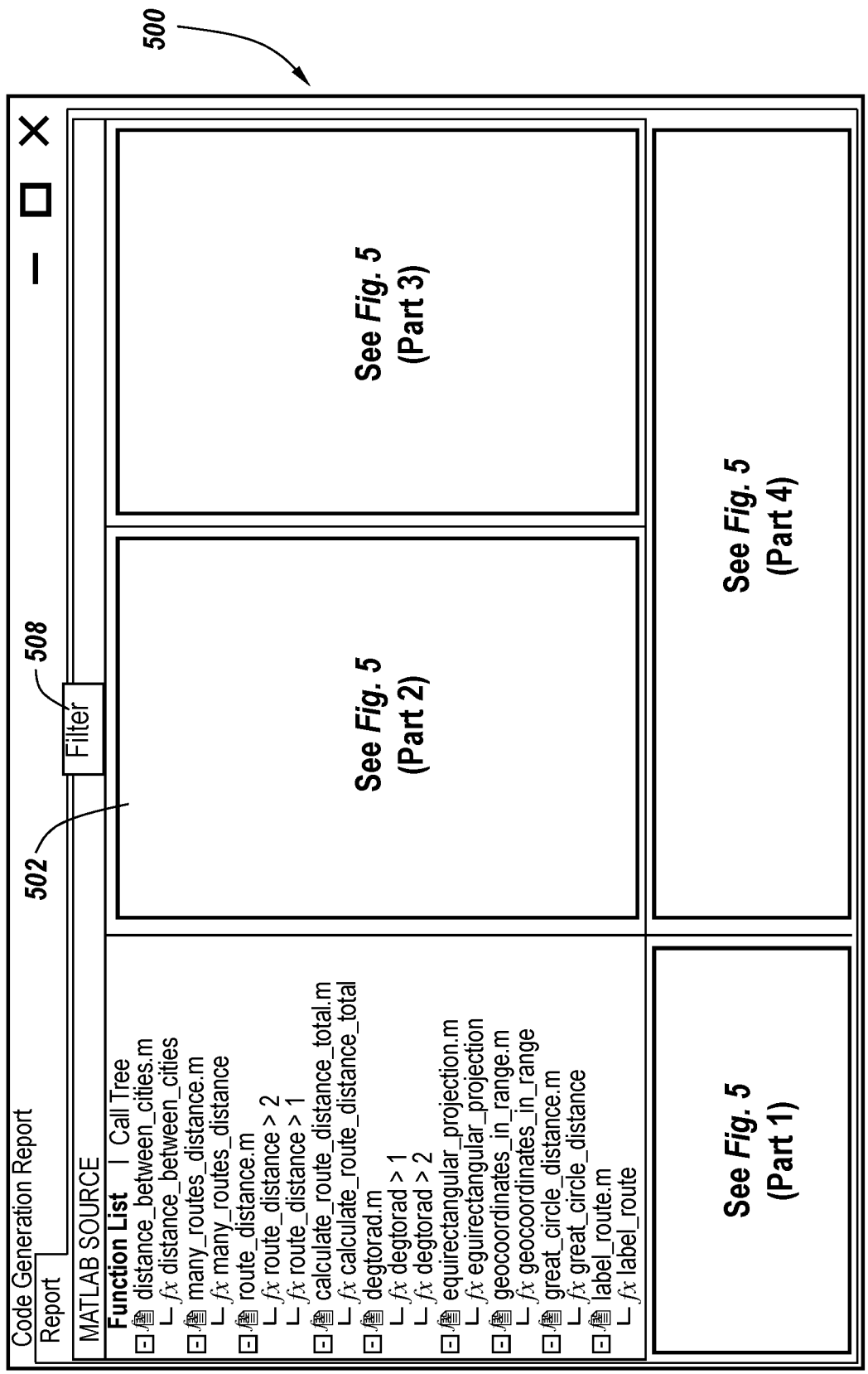
FIG. 5 is a depiction of an exemplary user interface that may be used with exemplary embodiments.
Figure 5:
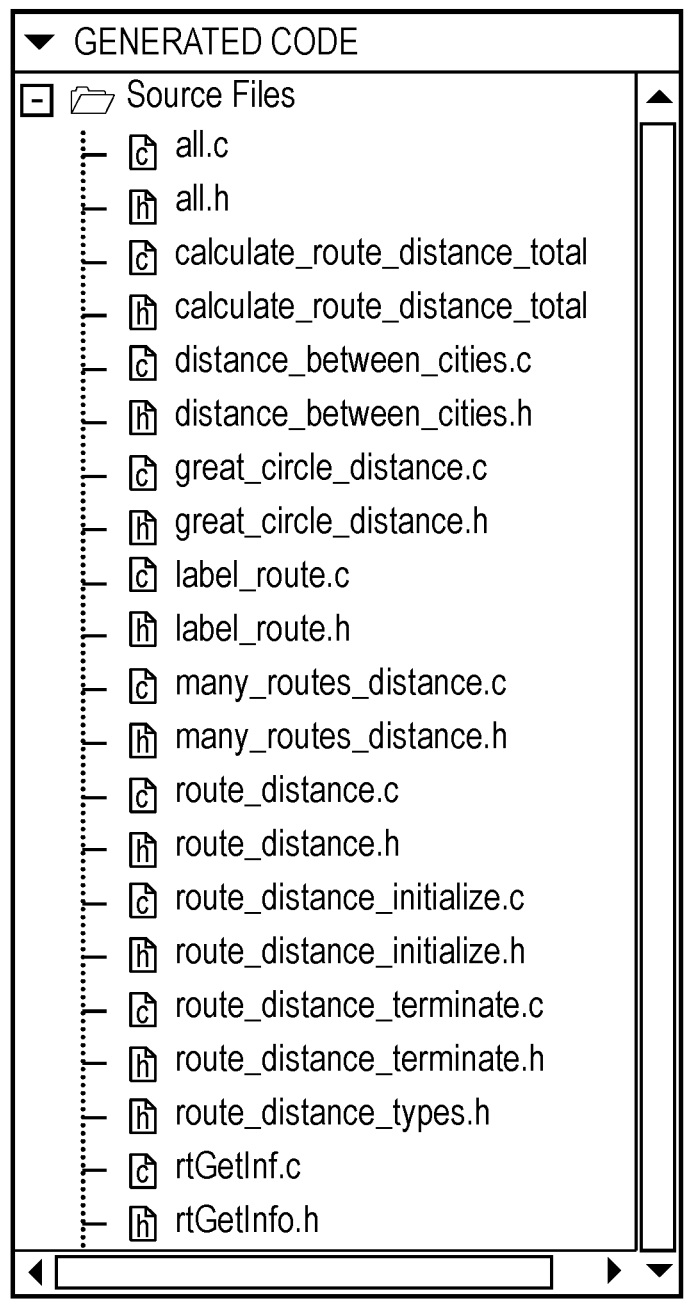

FIG. 5 shows an example of a user interface 500 that may be provided in some exemplary embodiments. The user interface 500 may include a first pane 502 in which at least a portion of the first representation is displayed and a second pane 504 in which at least a portion of the second representation is displayed. A central portion 506 is positioned between the panes 502 and 504 in which visual traces pass from semantic constructs in the first representation to the correlated semantic constructs in the second representation 504. A filter button 508 may be provided to request filtering of the representations. Pressing the filter button 508 may cause a dialog to pop up to gather information regarding what type of filtering to perform.

The user interface 500 may also provide an indication of the number of traceable elements there are in a representation. All of the traceable elements will in many cases not be visible on the user interface 500 at the same time.

The user interface 500 (FIG. 5) may in some instances be collapsible to show only the correlated semantic constructs rather than the rest of the representations. This helps to remove visual clutter on the user interface. The viewer can focus solely on the correlated semantic constructs.

Figure 6:
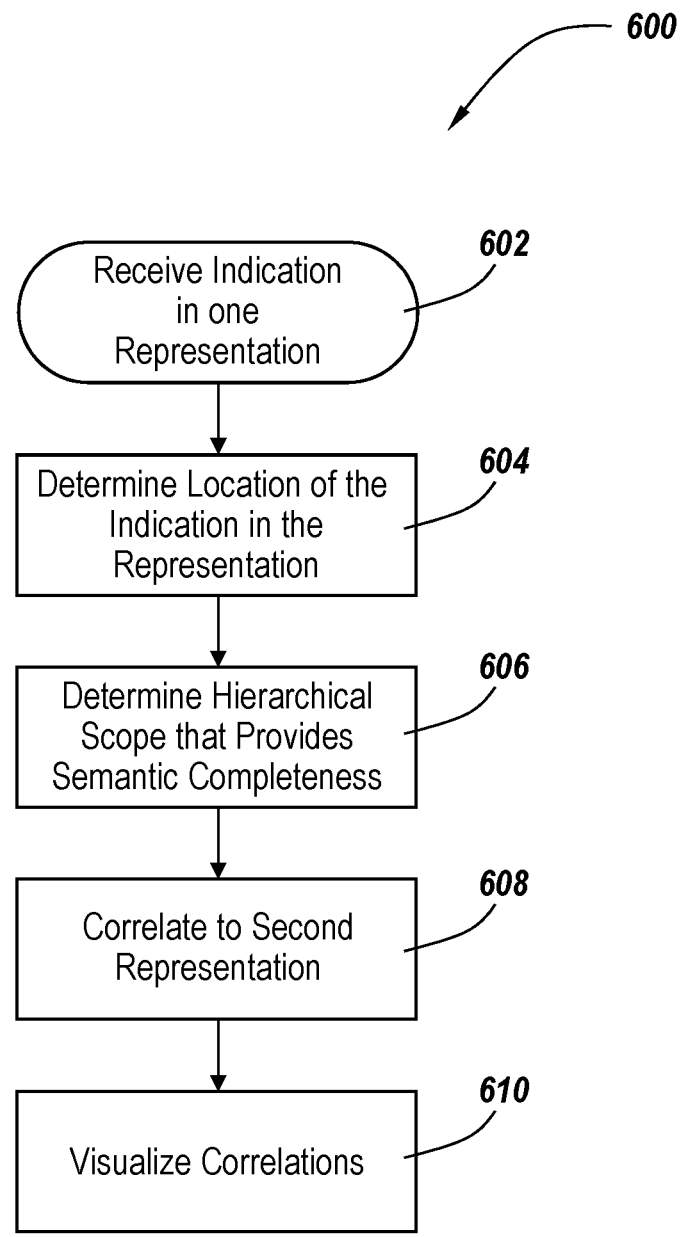
FIG. 6 is a flowchart illustrating the steps that are performed in determining how to visualize correlations between semantic constructs.

FIG. 6 shows a flowchart 600 of the steps that may be performed in visualizing a correlation. The process begins with receiving an indication of an action in one of the representations (step 602). This may take many different forms. In some embodiments, a user positions a cursor over a character or a group of characters of one of the representations that is displayed on the user interface such as user interface 500 shown in FIG. 5. The action may take the form, for example, of a hover where the cursor is positioned over the character or a group of characters for a fixed period of time without moving or a click, such as depressing a mouse button while the cursor is positioned over the character or group of characters. The party initiating the action may be a programmatic entity or user. Still further, the action may be performed by a programmatic means or result from activity on another input device, such as a mouse, pointing device or keyboard.

In step 604, a determination is made of the location of the indication in the representation. In the case where a cursor is utilized, the system knows the cursor position and then can map the cursor position to the character or group of characters held in a text buffer and displayed on the user interface. Based upon the determined location, the system determines a hierarchal scope that provides semantic completeness in step 606. This entails determining which semantic construct or semantic constructs are chosen based on the location and based upon the hierarchy of semantic constructs in the representation.

The exemplary embodiments attempt to communicate information to users along the natural conceptual boundaries of a representation. The goal is provide the reduced or minimal conglomeration of more granular semantic constructs for which a higher level meaning can be seen. This is the idea behind "semantic completeness." Examples include finding and emphasizing a larger statement in which an expression resides or finding and emphasizing a full loop that contains a specific loop condition.

A benefit of this approach is that the approach preserves the semantic granularities of the vernacular of a given representation. This makes it easier for an end user to translate a foreign methodology that holds an inherent semantic meaning into the end user's understanding of the vernacular of the representation.

Once it is determined which semantic constructs are chosen, the system determines the correlated semantic construct or semantic constructs in the second representation (step 608). This may entail, for example, looking at the data set to understand which semantic constructs are correlated to the chosen constructs in the first representation. Lastly, in step 610, the correlations are visualized, by providing visual cues of the correlations.

As was mentioned above, the visual cues may take different forms and generally may be provided by visual traces that extend between semantic constructs in the first representation to semantic constructs in the second representation. In some embodiments, the visual traces are provided by shading the constructs. In some embodiments, the portion of the visual trace associated with first representation may have a first color and a portion of the visual trace having a second trace may be in a second color. As mentioned above, different gray scale levels may be used and other visual cues may be used. Certain parameters of color may be used to visually distinguish the portions of the trace and may be used to distinguish between semantic constructs that are correlated and other portions of the representation.

Still further, as was discussed above, the visualization of the correlations may also visualize levels of nesting. For example, nested constructs may have a visual trace that is a different shade. The shading may reflect the level of nesting. In some embodiments, each successive level of nesting is assigned a darker shade of color.

Figure 7A:
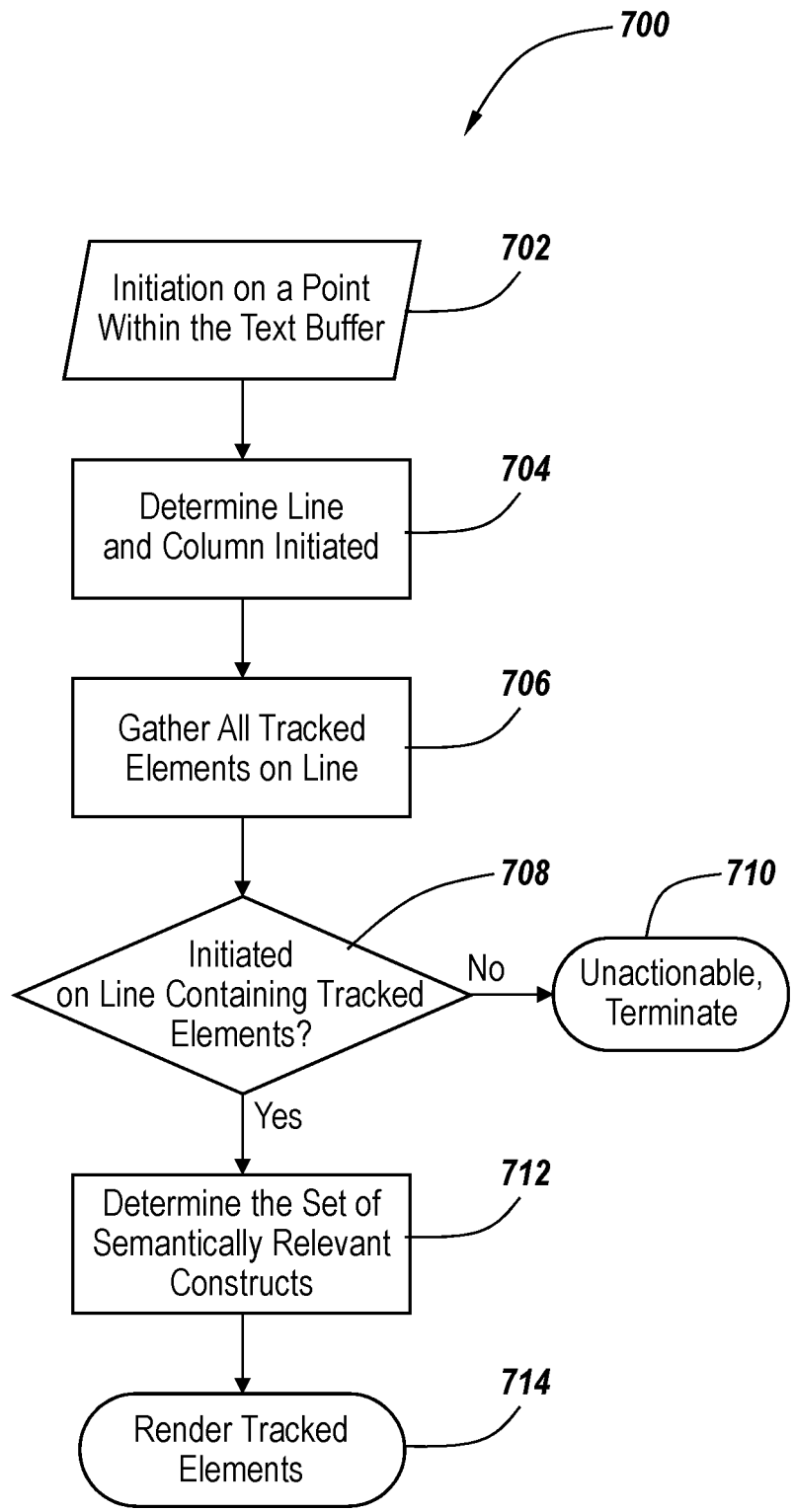
FIG. 7A is a flowchart illustrating the steps that are performed to identify a set of semantic constructs in response to an initiated action by a party.

FIG. 7A provides more detail regarding step 608 of FIG. 6. In step 702, a point within the text buffer that holds the representation is identified based on the location of the action. In the case where the representation is a programming language representation, the text buffer may hold the text of the programming language code. The line and column of the point is identified (step 704). In the case of programming language representation, the programming language code may have a line number and an associated column positions. Similarly, with a textual representation, such line and column information may be identifiable. The system then gathers all tracked elements (i.e., semantic constructs that are tracked and thus may be correlated) that are on the identified line (step 706). A determination is made whether the initiation was on a line containing tracked elements in step 708. Some lines may not contain semantic constructs that are correlated with semantic constructs in the other representation and thus are not trackable. In such an instance, the result is unactionable and the process is terminated in step 710. However, if the initiation is on a line containing trackable elements, the system determines a set of semantically relevant constructs in step 712. The tracked elements are then rendered by providing the visual trace for the tracked elements in the representation on the user interface based on the initiation (step 714).

Figure 7B:
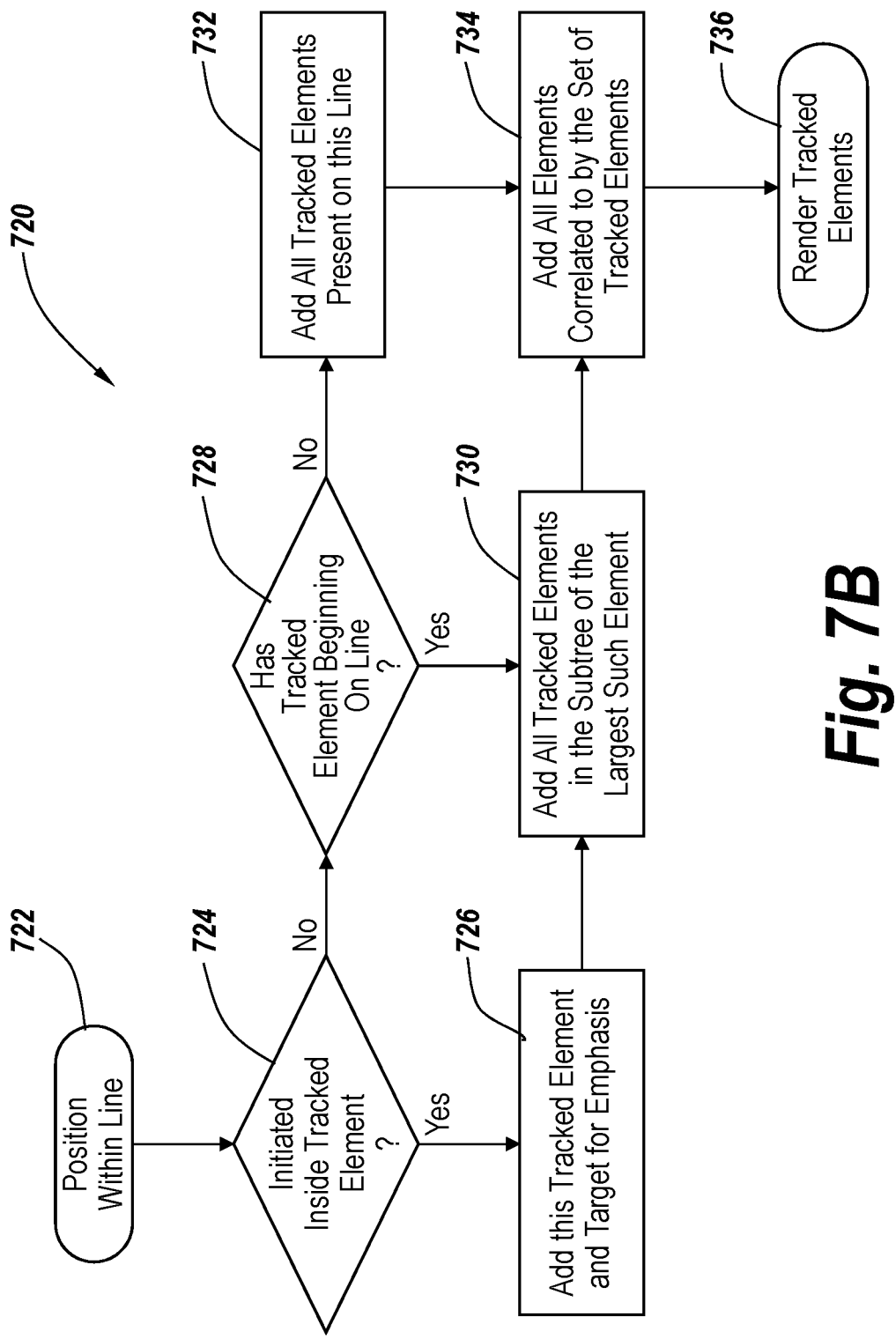
FIG. 7B illustrates the steps that are performed to identify which tracked elements should be rendered in a visualization of a correlation between semantic constructs.

FIG. 7B provides more detail on determining how to determine the set of semantically relevant constructs (i.e. step 712). As shown in flowchart 720, the position within the line of the identified point is identified in step 722. For example, where the point is associated with a cursor position, the location of the cursor position within the line is identified. In step 724, a check is made whether the position is initiated inside a tracked element. If the point is within a tracked element or is initiated within a tracked element, the tracked element and the correlated semantic constructs in the other representation are added in step 726. If the position is not inside the tracked element, a check is made whether the line has a tracked element beginning on the line in step 728. If there is a tracked element at the beginning of the line, all tracked elements in the subtree of the largest such element are added (step 730). If there is not a tracked element beginning on the line, all tracked elements present on the line are added (step 732). Thus, through steps 730 and 732, the context may be noted and rendered in the visual trace. In the case where the position is not at the beginning of the line, all tracked elements present on the live are visually distinguished, whereas when the position at the beginning of the line all tracked elements in the subtree of the largest element are visually distinguished in the visual trace. In step 734, all elements correlated by the set of tracked elements are added, and tracked elements are rendered by providing a visual trace in step 736.

Figure 8A:
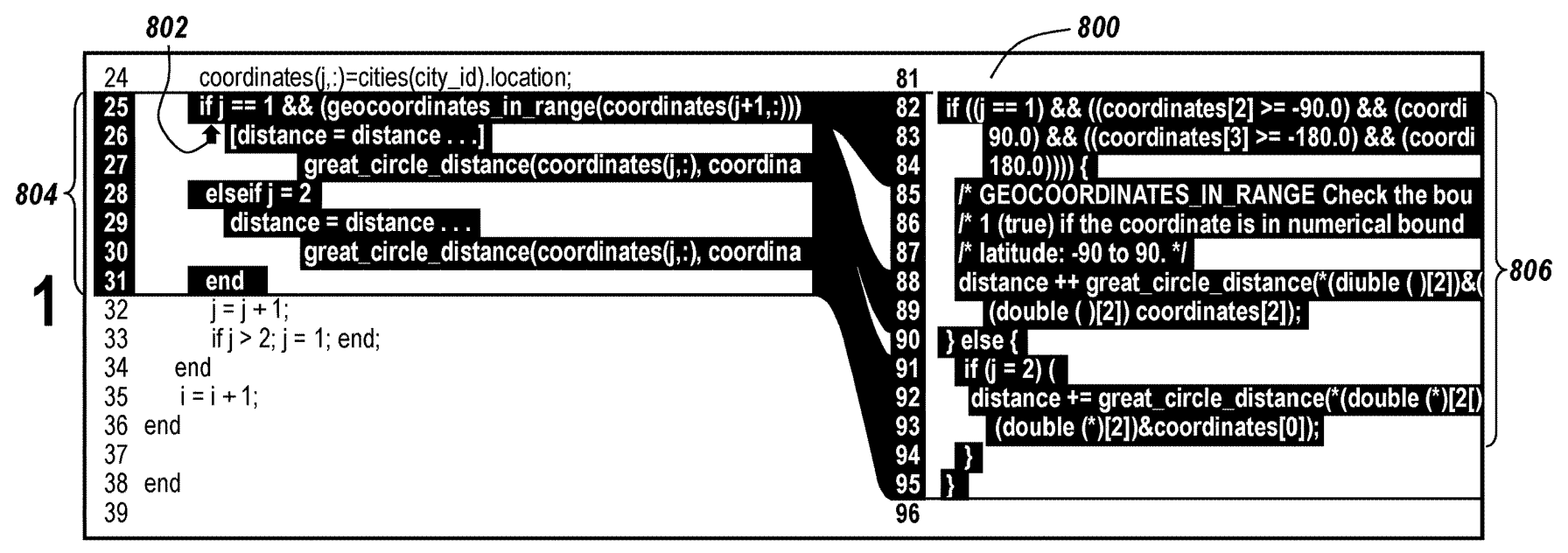

FIGS. 8A-8D help illustrate the identification of a higher level semantic construct (i.e., an entire if then block) along with intermediate but semantically meaningful sub-constructs. FIGS. 8A-8D exemplify a workflow to drill down from high level semantic constructs through the levels to the lower level semantic constructs while still maintaining the greater context. In these examples, the action is a curser hovers at a curser position. In FIG. 8A, the cursor is positioned to point to the "if" at the beginning of line 25. As such, the entire if statement is indicated as the semantic construct that is a tracked element. The entire if statement is highlighted and the highlighted color or shade is the same. The correlated if statement 806 is shown for the second representation and is highlighted.

In FIG. 8B, the cursor position 810 has been moved to select the group of coordinates for the j==1 portion of line 25. This causes the shading to change to indicate that the if statement is still shaded to indicate context but in a lighter color than the j==1 portion of the line, which is a nested semantic construct. Accordingly, the shading of the corresponding semantic construct 806 in the second representation is changed. Portion 811 in the second representation is shaded darker because it is correlated with the j==1 portion whereas the other portions remain the lighter shade.

In FIG. 8C, the cursor 812 is at a different position to select expression 813. The shading is updated in the visual trace to reflect the movement of the cursor position. Portion 815 in the second representation is shaded darker to reflect the movement of the cursor and a correlation with the nested semantic construct. The context for the nested constructs continue to be visually distinguished in the representations.

Figure 8D:
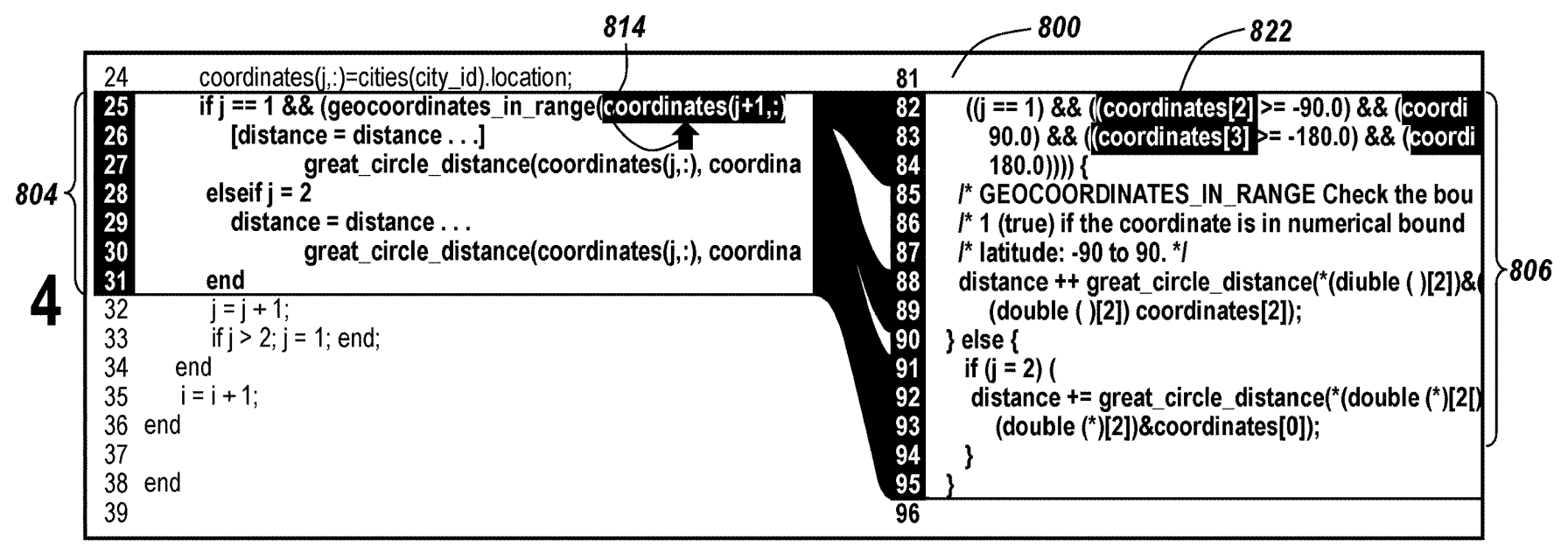

In FIG. 8D, the cursor position 820 is moved again to point to a different construct 821. The shading again is updated for the first representation and the shading is darkened for corresponding semantic construct 822 in the second representation.

Figure 9:
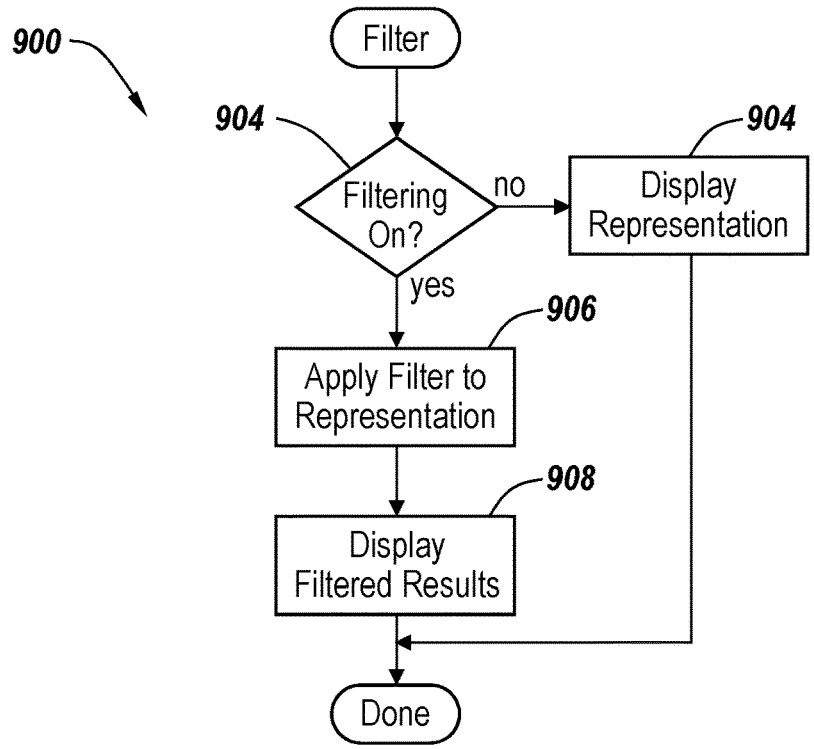
FIG. 9 is a flowchart illustrating steps that may be performed with respect to filtering for representation of functionality.

One alternative that may be provided in some embodiments is filtering. The filtering enables a party to filter code in the source representation and/or generate a source representation based upon filtering criteria. FIG. 9 depicts a flowchart 900 of the steps that are performed in such filtering. First, a check may be made whether the filtering is to be applied in step 902. If no filtering is applied, the associated representation is used (step 904), and the appropriate portion of the representation is displayed in the user interface. However, if the filtering is to be applied, the filter is applied to the representation (step 906). For example, certain criteria may be applied such as only show portions of the code for representation that are compliant with a given standard. Other filter criteria include code coverage, requirements, data buffer usage, parameter usage, profiling information and code violations, for example. The filtered results are then displayed in the traceable user interface (step 908). Filtering may also be used, for instance, for identifying common and different traces between two different attempts at code generation. Filtering may show only traces for programming language constructs that have warnings, errors or inefficient coding. Another example, is to filter to show only code that executes using a graphics processing unit (GPU) or, code that may execute in parallel.

An additional example is the case where a parallel iterator such as the parfor found in MATLAB is used. In that case, each iteration is independent of the others and may be executed in parallel. The filtering may be used to identify code for parallel processing. Thus, the parfor code is shown when such filtering is applied.

Figure 10:
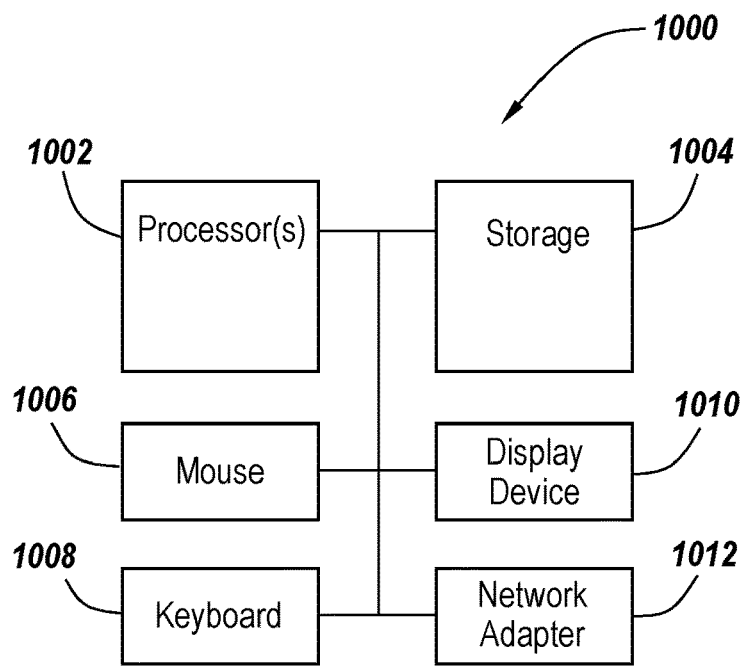
FIG. 10 illustrates a block diagram of a computing device suitable for practicing an exemplary embodiment.

FIG. 10 shows an example of a computing system 1000 that may be used to practice the exemplary embodiments. The computing system 1000 may include one or more processors 1002, such as microprocessors, processing logic, a field programmable gate array (FPGA), an application specific integrated circuit (ASIC) or other processing device. The one or processors have access to a storage 1004. The storage may take a number of different forms. The storage may include primary memory and/or secondary memory. It will be appreciated that a number of different storage devices may be used, including, magnetic disc storage, optical disc storage, magnetic tape, random access memory (RAM), dynamic random access memory (DRAM), read only memory (ROM), flash memory, solid state memory, programmable read only memory (PROM), removable memory, such as disc storage, thumb drives and the like. Moreover, the storage 1004 is intended to include non-transitory computer-readable storage media.

Figure 11:
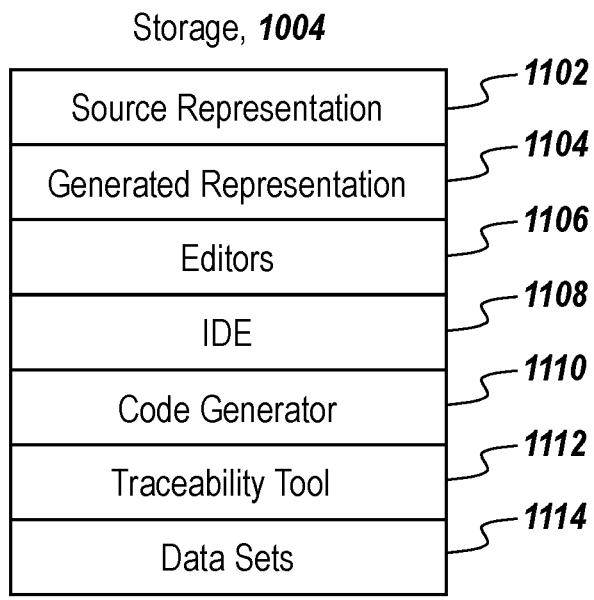
FIG. 11 is a diagram illustrating possible contents for storage in the computing device of FIG. 10.

FIG. 11 shows a diagram of some of the components that may be stored in the storage 1104 in exemplary embodiments. The storage 1104 may hold the source representation 1102 as well as the generated representation 1104. The storage 1104 may also hold the program editors 1106, that are used to edit the source representation 1102 and generated representation 1104. The storage 1104 may hold an integrated development environment (IDE) 1108. The storage 1004 may also hold code generator 1110. The storage 1104 may hold the traceability tool 1112. The traceability tool 1112, code generator 1110, IDE 1108 and editors 1106 may all be executed by the processors 1102. The storage 1104 may hold the location data sets and other data sets 1314.

Referring again to FIG. 10, input devices, such as mouse 1106 and keyboard 1108, may be provided for the computing system 1000. The computing system 1000 may include display device 1010 on which the traceability user interface tool may be displayed. The computing system 1000 may include a network adapter 1012 for connected to a local area network or for connecting to a wide area network, such as the Internet.

The depiction of FIG. 10 is intended to merely illustrative and not limiting or exhaustive.

Figure 12:
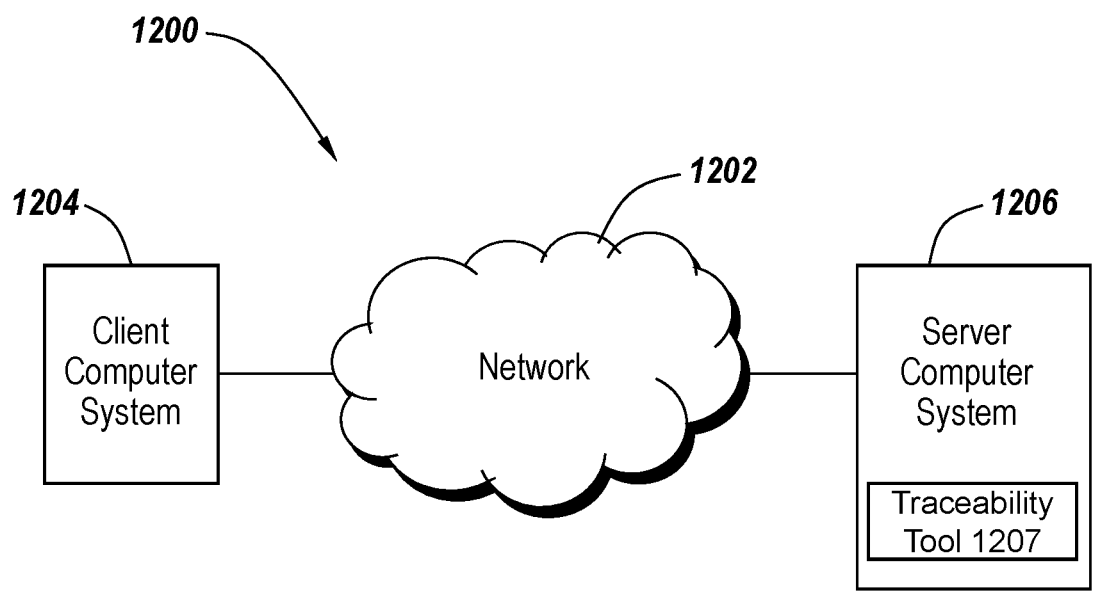
FIG. 12 depicts a distributed environment suitable for practicing illustrative embodiments.

It some exemplary embodiments, the computing functionality may be provided in a distributed environment 1200, such as shown in FIG. 12. In this example case, a client computer 1204 communicates over a network 1202, such as the internet, with a server computer system 1206. In such a case, the server computer system 1206 may provide the traceability tool 1207, and the traceability tool 1207 may execute on the server computer system 1206 on behalf a client computer system request 1204.

When the present invention has been described with reference to exemplary embodiments herein, those skilled in the art will appreciate the various changes in form and detail may be made without departing from the intended scope of the invention as defined in the appended claims.

What is claimed as new and desired to be protected by Letters Patent of the United States is:

1. A method, performed by a computing device, comprising:
    displaying at least a portion of a first representation of functionality on a first user interface;
    receiving an indication of an action at a location on the first user interface;
    determining the location of the action as being over one or more characters in the first representation of functionality;
    based on the determined location, identifying a hierarchical scope of semantic constructs in the first representation that provide semantic completeness;
    displaying a second representation of functionality on a second user interface;
    determining at least one semantic construct in the second representation of functionality as being correlated to the semantic constructs in the hierarchical scope; and
    displaying a visual cue that the at least one semantic construct of the second representation of functionality is correlated to the semantic constructs of the first representation of functionality in the hierarchical scope, wherein the visual cue visually identifies both the semantic constructs of the first representation of functionality in the hierarchical scope and the at least one correlated semantic construct of the second representation of functionality.

2. The method of claim 1 wherein the first representation of functionality and the second representation of functionality each comprise one of: textual programming code, graphical programming code, textual content or a model.

3. The method of claim 1 wherein the first representation of functionality and the second representation of functionality are semantically equivalent.

4. The method of claim 1 wherein the semantic constructs include at least one of an expression, a statement, a function, a macro, a level of a syntax tree, a model component, a block, a line, a diagram, an icon, a requirement or an object.

5. The method of claim 1 wherein the visual cue provides a visual trace between the semantic constructs in the identified hierarchical scope of the first representation of functionality and the at least one correlated semantic construct of the second representation of functionality.

6. The method of claim 1 wherein the identified hierarchical scope is a single semantic construct.

7. The method of claim 1, wherein the first user interface and the second user interface are a same user interface.

8. A method, performed by a computing device, comprising:
    displaying at least a portion of a first representation of functionality on a first user interface;
    receiving an indication of an action at a location on the first user interface;
    determining the location of the action as being over one or more characters in the first representation of functionality;
    based on the determined location, identifying a hierarchical scope of semantic constructs that provide semantic completeness, wherein the identifying the hierarchical scope of semantic constructs that provide semantic completeness comprises:
        determining what line in the first representation the location is on;
        identifying tracked elements on the determined line; and
        based on the identified tracked elements, identifying the hierarchical scope of semantic constructs in the first representation;
    displaying a second representation of functionality on a second user interface;
    determining at least one semantic construct in the second representation of functionality as being correlated to the semantic constructs in the hierarchical scope; and
    displaying a visual cue that the at least one semantic construct of the second representation of functionality is correlated to the semantic constructs of the first representation of functionality in the hierarchical scope, wherein the visual cue visually identifies both the semantic constructs of the first representation of functionality in the hierarchical scope and the at least one correlated semantic construct of the second representation of functionality.

9. The method of claim 1 further comprising:
    applying a filtering criterion to the first representation of functionality to select what portions of the first representation of functionality and/or what portions of the second representation of functionality are displayed.

10. The method of claim 1,
    wherein the first representation of functionality is source code and the second representation of functionality is source code.

11. A non-transitory storage medium storage medium storing instructions that cause a processor to:
    display at least a portion of a first representation of functionality on a first user interface;
    receive an indication of an action at a location on the first user interface;
    determine the location of the action as being over one or more characters in the first representation of functionality;
    based on the determined location, identify a hierarchical scope of semantic constructs in the first representation that provide semantic completeness;
    display a second representation of functionality on a second user interface;
    determine at least one semantic construct in the second representation of functionality as being correlated to the semantic constructs in the hierarchical scope; and
    display a visual cue that the at least one semantic construct of the second representation of functionality is correlated to the semantic constructs of the first representation of functionality in the identified hierarchical scope, wherein the visual cue visually identifies both the semantic constructs of the first representation of functionality in the hierarchical scope and the at least one correlated semantic construct of the second representation of functionality.

12. The non-transitory storage medium of claim 11 wherein the first representation of functionality and the second representation of functionality each comprise one of textual programming code, textual content, graphical programming code or a model.

13. The non-transitory storage medium of claim 11 wherein the first representation of functionality and the second representation of functionality are semantically equivalent.

14. The non-transitory storage medium of claim 11 wherein the programming language constructs include at least one of an expression, a statement, a function, a macro, a level of a syntax tree, a model component, a block, a line, a diagram, an icon, a requirement or an object.

15. The non-transitory storage medium of claim 11 wherein the visual cue provides a visual trace between the semantic constructs in the hierarchical scope of the first representation and the at least one of semantic correlated construct of the second representation of functionality.

16. The non-transitory storage medium of claim 11, wherein the identified hierarchical scope is a single semantic construct.

17. The non-transitory storage medium of claim 11 further storing instructions causing the processor to:
apply a filtering criterion to the first representation of functionality to select what portions of the first representation of functionality and/or what portions of the second representation of functionality are displayed.

18. The non-transitory storage medium of claim 11 wherein the first representation of functionality is source code and the second representation of functionality is source code.

19. The non-transitory computer-readable storage media of claim 11, wherein the first user interface and the second user interface are a same user interface.

20. A non-transitory storage medium storage medium storing instructions that cause a processor to:
display at least a portion of a first representation of functionality on a first user interface;
receive an indication of an action at a location on the first user interface;
determine the location of the action as being over one or more characters in the first representation of functionality;
based on the determined location, identify a hierarchical scope of semantic constructs that provide semantic completeness, wherein the identifying the hierarchical scope of semantic constructs that provide semantic completeness comprises:
determining what line in the first representation the location is on;
identifying tracked elements on the determined line; and
based on the identified tracked elements, identify the hierarchical scope of semantic constructs in the first representation;
display a second representation of functionality on a second user interface;
determine at least one semantic construct in the second representation of functionality as being correlated to the semantic constructs in the hierarchical scope; and
display a visual cue that the at least one semantic construct of the second representation of functionality is correlated to the semantic constructs of the first representation of functionality in the identified hierarchical scope, wherein the visual cue visually identifies both the semantic constructs of the first representation of functionality in the hierarchical scope and the at least one correlated semantic construct of the second representation of functionality.

21. A computing device comprising
a display device;
a storage;
a processor for executing instructions to:
display at least a portion of a first representation of functionality on a first user interface;
receive an indication of an action at a location on the first user interface;
determine the location of the action as being over one or more characters in the first representation of functionality;
based on the determined location, identifying a hierarchical scope of semantic constructs in the first representation that provide semantic completeness;
display a second representation of functionality on a second user interface;
determine at least one semantic construct in the second representation of functionality as being correlated to the semantic constructs in the hierarchical scope; and
display a visual cue that the at least one semantic construct of the second representation of functionality is correlated to the semantic constructs of the first representation of functionality in the hierarchical scope, wherein the visual cue visually identifies both the semantic constructs of the first representation of functionality in the hierarchical scope and the at least one correlated semantic construct of the second representation of functionality.

22. The computing device of claim 21, wherein the first user interface and the second user interface are a same user interface.

* * * * *